United States Patent
Ruth et al.

(10) Patent No.: US 7,849,681 B2
(45) Date of Patent: Dec. 14, 2010

(54) APPARATUS, SYSTEM, AND METHOD FOR ENGINE-GENERATED HEAT UTILIZATION IN A $NO_x$-ADSORBER AFTERTREATMENT SYSTEM

(75) Inventors: Michael J. Ruth, Franklin, IN (US); Bradlee J. Stroia, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 856 days.

(21) Appl. No.: 11/619,159

(22) Filed: Jan. 2, 2007

(65) Prior Publication Data
US 2008/0282684 A1    Nov. 20, 2008

(51) Int. Cl.
*F01N 3/10*    (2006.01)

(52) U.S. Cl. .............................. 60/301; 60/300; 60/302; 60/320; 60/284

(58) Field of Classification Search .................... 60/282, 60/284–289, 301; 138/146, 149
See application file for complete search history.

(56) References Cited

U.S. PATENT DOCUMENTS

| | | | | |
|---|---|---|---|---|
| 4,345,430 A * | 8/1982 | Pallo et al. | ..................... | 60/282 |
| 4,902,487 A | 2/1990 | Cooper et al. | | |
| 5,144,800 A * | 9/1992 | Shioya et al. | ................... | 60/323 |
| 5,163,289 A * | 11/1992 | Bainbridge | .................... | 60/274 |
| 5,718,956 A * | 2/1998 | Gladfelter et al. | .......... | 428/35.9 |
| 5,950,423 A | 9/1999 | Hampton | ...................... | 60/274 |
| 6,044,644 A * | 4/2000 | Hu et al. | ......................... | 60/302 |
| 6,151,547 A | 11/2000 | Kumar et al. | ............... | 701/101 |
| 6,220,022 B1 * | 4/2001 | Muller et al. | .................. | 60/299 |
| 6,347,511 B1 * | 2/2002 | Haines | .......................... | 60/274 |
| 6,832,473 B2 | 12/2004 | Kupe et al. | ..................... | 60/286 |
| 6,957,527 B2 * | 10/2005 | Ueda et al. | ..................... | 60/274 |
| 7,137,246 B2 * | 11/2006 | van Nieuwstadt et al. | ..... | 60/295 |
| 2004/0083716 A1 * | 5/2004 | Twigg | ........................... | 60/284 |
| 2004/0173450 A1 * | 9/2004 | Bruce Fisher et al. | ....... | 204/164 |
| 2004/0187483 A1 * | 9/2004 | Dalla Betta et al. | ........... | 60/286 |
| 2005/0193726 A1 * | 9/2005 | Funakoshi | .................... | 60/323 |
| 2005/0223699 A1 | 10/2005 | Ancimer et al. | ................ | 60/286 |
| 2005/0232826 A1 | 10/2005 | LaBarge et al. | ............. | 422/171 |
| 2006/0053772 A1 | 3/2006 | Dou et al. | ....................... | 60/285 |
| 2006/0053776 A1 | 3/2006 | Ancimer et al. | ................ | 60/286 |
| 2006/0213187 A1 * | 9/2006 | Kupe et al. | ..................... | 60/286 |

FOREIGN PATENT DOCUMENTS

WO    WO2004/110597    6/2004    .................... 53/96

* cited by examiner

*Primary Examiner*—Thomas E Denion
*Assistant Examiner*—Jesse Bogue
(74) *Attorney, Agent, or Firm*—Kunzler Needham Massey & Thorpe (57) ABSTRACT

An apparatus, system, and method are disclosed for utilizing engine-generated heat in a $NO_x$-adsorber system. The apparatus may comprise a combustion device generating a heated exhaust stream. The apparatus may include a catalytic component that initiates at least one exhaust conditioning reaction within the heated exhaust stream. The catalytic component is fluidly coupled to the engine with a downpipe segment configured to preserve a minimum temperature at the catalytic component inlet based on specified operating conditions for the combustion device. The apparatus may also include a NOx-adsorber fluidly coupled to the catalytic component with a second downpipe segment.

28 Claims, 4 Drawing Sheets

APPARATUS, SYSTEM, AND METHOD FOR ENGINE-GENERATED HEAT UTILIZATION IN A NO$_x$-ADSORBER AFTERTREATMENT SYSTEM

BACKGROUND OF THE INVENTION

1. Field of the Invention

This invention relates to the NO$_x$-adsorber aftertreatment system, and more particularly relates to utilizing engine-generated heat in NO$_x$-adsorber aftertreatment systems.

2. Description of the Related Art

Emissions regulations on nitrogen oxides (NO and NO$_2$, commonly termed NO$_x$) have reached the point in many areas of the world where engine-out concentrations of NO$_x$ cannot be lowered to meet emissions standards. In some cases, aftertreatment devices are added to the exhaust system of the engine to further reduce NOx. One aftertreatment system to reduce NO$_x$ is the NO$_x$-adsorber catalyst system (NAC), which intermittently adsorbs NO$_x$ (specifically the NO$_2$ component of NO$_x$), then desorbs (releases) the NO$_x$ while reducing it to other nitrogen compounds to meet emissions standards.

One challenge in NAC systems under the currently available technology is that the amount of NO$_x$ that can be stored on the NAC depends upon temperature. Further, NAC systems require periodic regeneration events to release and reduce the adsorbed NO$_x$. These regeneration events require significant temperature to release the NO$_x$, often more temperature than is naturally produced by the engine. A common method to produce the required temperature is to burn a hydrocarbon in the exhaust system, either by injecting extra hydrocarbon in the engine that does not combust within the cylinder, or by directly injecting hydrocarbon into the exhaust pipe with an auxiliary injector. However, in many applications, especially those where the engine does not spend a significant portion of the engine duty cycle under a significant work load (for example, in light duty applications), the engine does not produce enough heat to support burning hydrocarbons in the exhaust. This problem can be exacerbated by applications where the NAC must be placed at a significant distance from the engine due to the packaging requirements of the application the engine is installed within.

The current technology addresses the problem that normally engines do not heat up the NAC very quickly at startup. Therefore, a startup converter, or a lightoff converter, is installed in some systems. The startup converter usually comprises a small catalyst configured to respond quickly to engine temperature changes. This reduces the time after engine startup until the system reaches emissions-compliance, and it can reduce the time to enter a regeneration event once the event is commanded. However, the use of a startup converter does not make the system capable of achieving a regeneration where the engine exhaust temperature and packaging limitations do not introduce enough temperature to the NAC to initiate a regeneration.

Another problem under the current technology is a set of limitations imposed by the composition of the exhaust gas. While NAC systems can adsorb only the NO$_2$ component of NO$_x$, diesel engines—a primary producer of NO$_x$ emissions—produce mostly NO rather than NO$_2$ when producing NO$_x$. The catalyst on the NAC can convert some NO to NO$_2$, and a pre-catalyst on the frontside of the NAC can also perform this conversion, but this reaction suffers from similar temperature issues as those experienced for the combustion of hydrocarbons.

A further problem imposed by the composition of the exhaust gas is the general lack of good reducing agents in the exhaust gas under typical engine operation. When the NAC is regenerated, hydrocarbons can be used as a reducing agent, and therefore the engine is typically operated in a "rich" configuration—or with less oxygen than stoichiometrically required to burn all of the fuel. However, hydrocarbons are an inefficient reducing agent for NO$_2$. Carbon monoxide (CO) can be a more effective reducing agent, but it is difficult to produce in large quantities in a diesel engine, and there are emissions limits on the CO that can be emitted from the engine. Hydrogen (H$_2$) is a very effective reducing agent for NO$_2$, but the current technology available to generate H$_2$ requires additional reforming equipment and/or very high temperatures (700 deg C. or greater) to achieve H$_2$ production under currently available technologies.

From the foregoing discussion, it should be apparent that a need exists for an apparatus, system, and method that provides for improved NAC regeneration performance, particularly for engines that spend a large portion of the engine operating time at operating conditions where conventional NAC systems do not receive the temperature and exhaust gas composition to efficiently regenerate. Beneficially, such an apparatus, system, and method would utilize the engine-generated heat to assist the NAC in regenerating, and configure the exhaust gas composition to assist the NAC in achieving regeneration without the addition of expensive systems to reform hydrogen.

SUMMARY OF THE INVENTION

The present invention has been developed in response to the present state of the art, and in particular, in response to the problems and needs in the art that have not yet been fully solved by currently available particulate filter systems. Accordingly, the present invention has been developed to provide an apparatus, system, and method for engine-generated heat utilization in a NO$_x$-adsorber aftertreatment system that overcome many or all of the above-discussed shortcomings in the art.

An apparatus is disclosed for utilizing engine-generated heat in a NO$_x$-adsorber system. The apparatus comprises a combustion device with a heating chamber that generates a heated exhaust products stream. The apparatus further comprises an upstream downpipe segment that connects the engine exhaust to a catalytic component. The upstream downpipe segment has heat loss characteristics such that the heated exhaust products stream maintains at least at a selected minimum temperature corresponding to a selected combustion device operating condition. The catalytic component comprises a catalyst on a substrate whereby the catalyst initiates at least one exhaust conditioning reaction. The apparatus also has a downstream downpipe segment that connects the catalytic component outlet to a nitrogen-oxide adsorption catalyst (NAC). The NAC has a NO$_x$ adsorbing and NO$_x$ reducing catalyst on a substrate.

In one embodiment, the combustion device comprises an internal combustion engine, which may be a diesel engine. The selected combustion device operating condition may be an exhaust output temperature of the engine at a selected engine torque and engine speed. The selected combustion device operating condition may further comprise the exhaust output temperature at a selected ambient temperature value. The exhaust conditioning reaction(s) may comprise an NO to NO$_2$ conversion while the engine runs lean, and the at least one exhaust conditioning reaction may comprise a water gas shift reaction and a hydrocarbon partial oxidation reaction while the engine runs rich. The exhaust conditioning reaction(s) may comprise a hydrocarbon cracking reaction.

The apparatus may further comprise a turbocharger, and the exhaust output temperature may comprise the temperature at the turbocharger exhaust outlet. The upstream downpipe segment may be a mechanical coupling of the catalytic component to the turbocharger outlet. The upstream downpipe segment may be an insulated exhaust pipe segment, and/or an exhaust pipe segment with a length of less than 12 inches. In one embodiment, the catalytic component may contain a catalyst comprising platinum, rhodium, and palladium. The selected minimum temperature may further correspond to a selected ambient temperature. The selected minimum temperature may be a value selected to support the at least one exhaust conditioning reaction in the catalytic component.

A method is disclosed for treating exhaust gas. The method includes selecting an engine torque, engine speed, and ambient temperature at which a corresponding selected minimum temperature must be achieved. The method further includes determining an engine exhaust output temperature based on the selected engine torque, engine speed, and ambient temperature. The method continues with providing an upstream downpipe segment with heat loss characteristics such that the selected minimum temperature is achieved based on the exhaust output temperature and the selected ambient temperature. The method includes generating a heated exhaust products stream in an internal combustion engine, and conducting the heated exhaust products from the engine to a catalytic component through the upstream downpipe segment. The method further includes initiating a plurality of exhaust conditioning reactions on the heated exhaust products stream in the catalytic component, including an NO to $NO_2$ conversion, and a partial oxidation of unburned hydrocarbons in the heated exhaust products stream. The method further includes delivering the exhaust products stream to a nitrogen-oxide adsorption catalyst (NAC), and treating the exhaust products stream with the NAC to intermittently adsorb and reduce $NO_x$ in the exhaust products stream. In one embodiment, the plurality of exhaust conditioning reactions further include a hydrocarbon cracking reaction, and a water gas shift reaction.

A system is disclosed for treating exhaust gas. The system includes a diesel engine configured to generate a heated exhaust products stream as a byproduct of operation, and a turbocharger. The turbocharger is in fluid communication with the engine on an upstream side of the turbocharger, and in fluid communication with an upstream downpipe segment on the downstream side of the turbocharger. The upstream downpipe receives the heated exhaust products stream, and delivers the exhaust products stream to a catalytic component. The upstream downpipe segment has heat loss characteristics such that the heated exhaust products stream maintains at least a selected minimum temperature corresponding to an exhaust output temperature of the engine at a selected diesel engine torque, diesel engine speed, and ambient temperature. The catalytic component comprises a catalyst on a substrate whereby the catalyst initiates at least one exhaust conditioning reaction. The system includes a downstream downpipe segment that connects the catalytic component with a NAC. The NAC comprises a $NO_x$ adsorbing and $NO_x$ reducing catalyst on a substrate.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 4, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
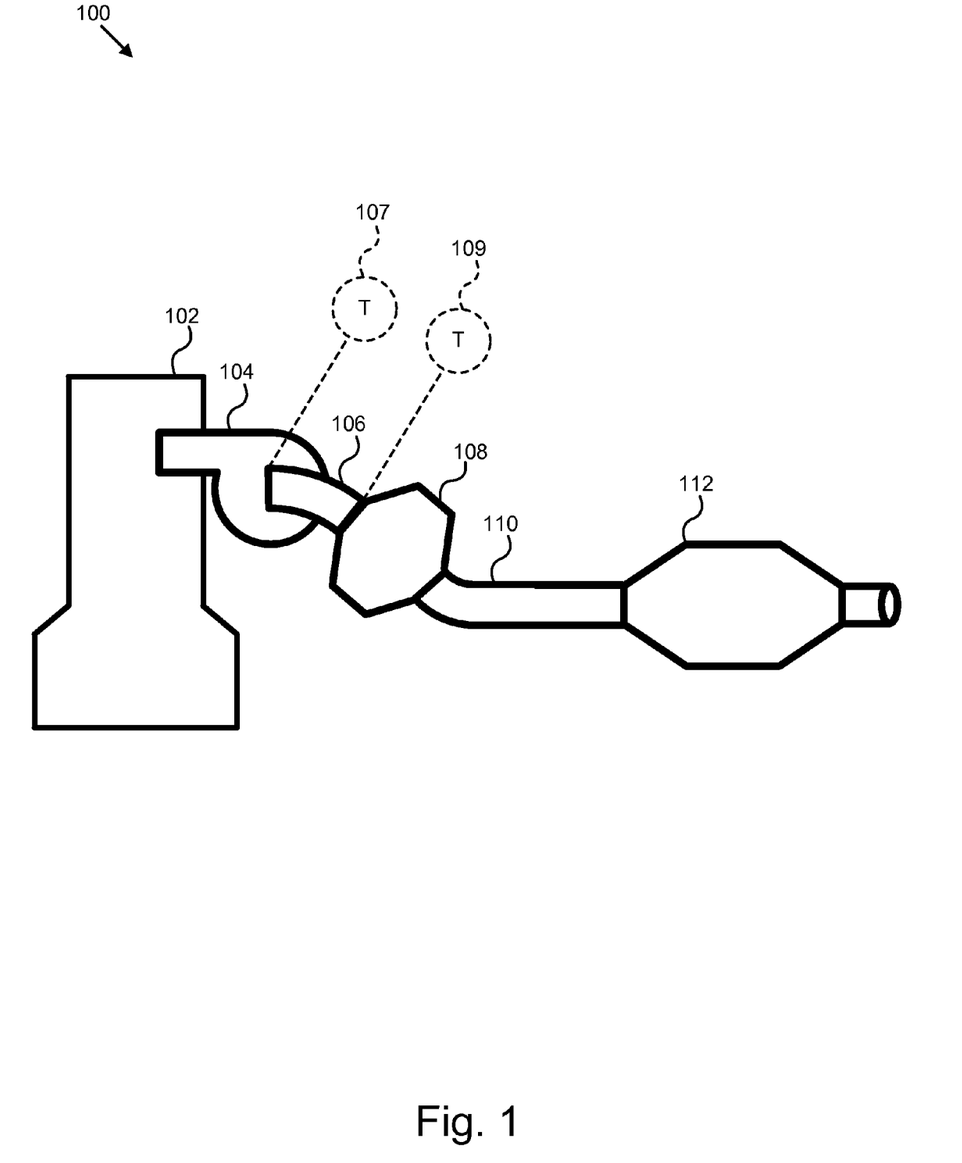
FIG. 1 is a schematic block diagram depicting one embodiment of a system for utilizing engine-generated heat in a $NO_x$-adsorber aftertreatment system in accordance with the present invention.

FIG. 1 is a schematic block diagram depicting one embodiment of a system 100 for utilizing engine-generated heat in a $NO_x$-adsorber aftertreatment system in accordance with the present invention. The system 100 comprises a combustion device 102 having disposed therein a heating chamber that generates a heated exhaust products stream. The combustion device 102 may be an internal combustion engine, and/or a diesel engine. Any other combustion device 102 which generates a heated exhaust products stream and may have a $NO_x$-adsorber aftertreatment system to treat the exhaust products stream is also contemplated within the scope of the invention.

The system 100 may further include a turbocharger 104 in fluid communication with the engine 102 on an upstream side of the turbocharger 104, and in fluid communication with an upstream downpipe segment 106 on the downstream side of the turbocharger 106. The upstream downpipe segment 106 receives the heated exhaust products stream, and delivers the exhaust products stream to a catalytic component 108.

The upstream downpipe segment 106 comprises heat loss characteristics such that the heated exhaust products stream maintains at least a selected minimum temperature 109 corresponding to an exhaust output temperature 107 of the engine 102 at a selected engine torque, engine speed, and/or ambient temperature. For example, the selected engine torque may be 100 foot-pounds, the selected engine speed may be 600 RPM, and the selected ambient temperature may be −5 degrees C. In the example, the exhaust output temperature 107 of the engine 102 at the selected engine operating conditions may be 225 degrees C. For the example, the selected minimum temperature 109 may be 200 degrees C., and the upstream downpipe segment 106 in the example comprises heat loss characteristics such that the heated exhaust products stream maintains at least the selected minimum temperature 109 of 200 degrees C. corresponding to the exhaust output temperature 107 of 225 degrees C.

The selected minimum temperature 109 may further correspond to the selected ambient temperature value. Using the above example, the upstream downpipe segment 106 comprises heat loss characteristics such that the heated exhaust products stream maintains at least the selected minimum temperature 109 of 200 degrees C. corresponding to the exhaust output temperature 107 of 225 degrees C. and the selected ambient temperature value of −5 degrees C.

Elements 107, 109 of FIG. 1 are indicators of the positions of the exhaust output temperature 107 and the selected minimum temperature 109 in one embodiment of the invention. The actual positions for these temperatures 107, 109 may vary with the particular embodiment of the invention. The temperatures 107, 109 may be measured with a temperature sensor, or they may be estimated from various system parameters. The selected minimum temperature 109 is a concept utilized for the design of the upstream downpipe segment 106, and is not a measured or estimated temperature utilized at the system 100 during the operation of the engine 102.

The system 100 further includes a catalytic component 108 comprising a catalyst on a substrate whereby the catalyst initiates at least one exhaust conditioning reaction. The exhaust conditioning reaction may be an NO to $NO_2$ conversion which improves the $NO_x$-elimination capability of a $NO_x$-adsorption catalyst (NAC) 112 by making a greater fraction of the engine-out $NO_x$ into absorbable $NO_2$ rather than NO. Experimental data indicates that significant NO to $NO_2$ conversion occurs at temperatures between about 150 degrees C. to 400 degrees C., with optimal conversion around 300 degrees C. for most catalyst compositions.

In one embodiment, the exhaust conditioning reaction may be partial oxidation of hydrocarbons in the exhaust stream. For example, some hydrocarbons may be partially oxidized and form CO or other molecules representative of reactions that do not proceed to fully oxidized end products. Partial oxidation of hydrocarbons normally begins at a significant rate at about 200 degrees C. and improves with temperature to an arbitrarily high temperature value. Partially oxidized hydrocarbons produce beneficial byproducts, such as CO, for reducing $NO_2$ as it desorbs in the NAC, and they make it more likely that the NAC will complete the oxidation of the hydrocarbons from the engine 102 than if the catalytic component 108 had not partially oxidized the hydrocarbons.

The exhaust conditioning reaction may be a reforming of unburned hydrocarbons in the exhaust stream, for example cracking of hydrocarbons from large molecules to small molecules. With the use of certain catalysts, for example a platinum-rhodium and/or a platinum-rhodium-palladium catalyst, some cracking and breakdown of hydrocarbons begins at 200 degrees C. and improves with higher temperatures. The partially broken hydrocarbons oxidize significantly better than the larger hydrocarbons in the NAC, and provide an improved reducing agent for desorbing $NO_2$ in the NAC over the larger hydrocarbons.

The exhaust conditioning reaction may be a water gas shift reaction producing hydrogen in the exhaust stream. The water gas shift reaction may occur on CO in the exhaust stream coming from the engine 102, or on partially oxidized hydrocarbons that become CO in the catalytic component 108. In one embodiment, the water gas shift reaction proceeds as: $CO+H_2O \rightarrow CO_2+H_2$. The hydrogen produced in a water gas shift reaction provides an excellent reducing agent for desorbing $NO_2$ in the NAC. The water gas shift reaction begins at a significant rate around 200 degrees C., and generally improves with temperature.

The exhaust conditioning reaction may be a lean $NO_x$ conversion reaction, where $NO_x$ compounds are directly reduced within the catalytic component 108. The lean $NO_x$ conversion reaction converts $NO_x$ to $N_2O$, $N_2$, and other non-emissions related products, and occurs at a significant rate over the range of approximately 200 degrees C. to 400 degrees C., with a peak rate at about 350 degrees C.

It is within the skill of one in the art to select the appropriate exhaust conditioning reactions and temperatures based on these disclosures and the particular challenges of a given embodiment of a system 100. For example, where a NAC is only marginally capable of adsorbing enough $NO_x$ for a given system 100, a lean $NO_x$ conversion reaction may be preferred and the combustion products from the engine 102 and selected minimum temperature 109 may be selected accordingly. Where reducing the $NO_2$ desorbing from the NAC is a challenge in a particular system 100, the water gas shift reaction may be preferred and the engine 102 may be optimized to produce the maximum allowable CO during regeneration periods where the NAC is desorbing and reducing $NO_2$. In a system 100 where an engine 102 produces a large fraction of NO relative to $NO_2$ in the produced $NO_x$, the NO to $NO_2$ conversion reaction may be optimized.

The system 100 further comprises a downstream downpipe segment 110 in fluid communication with the catalytic component 108. The downstream downpipe segment 110 receives the exhaust products stream from the catalytic component 108 and delivers the exhaust products stream to the NAC 112.

The system 100 includes a NAC 112 comprising a NOx adsorbing and NOx reducing catalyst on a substrate. The NAC 112 adsorbs $NO_2$ from the exhaust stream as it passes through the NAC 112. The engine 102 may periodically regenerate the NAC 112, typically by increasing the exhaust temperature 107 through changes in the engine 102 operation, and by switching the stoichiometric ratio of air to fuel in the engine from lean to rich, or from excess oxygen to less oxygen than required to fully combust the injected fuel within the engine 102. Therefore, the NAC 112 in one embodiment intermittently adsorbs and reduces $NO_x$ in the exhaust products stream.

Figure 2:
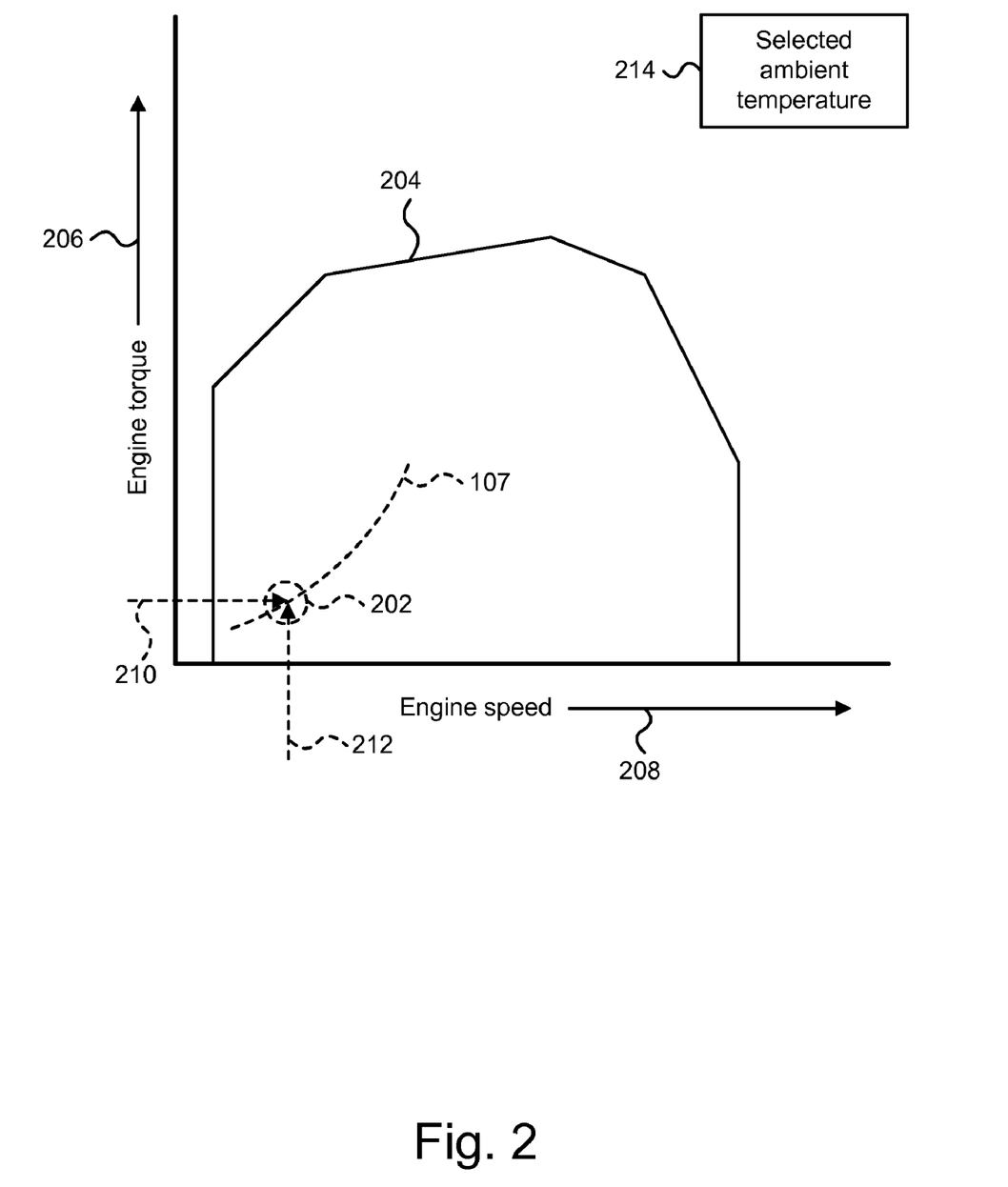
FIG. 2 is an illustration of one embodiment of a combustion device operation condition in accordance with the present invention.

FIG. 2 is an illustration of one embodiment of a combustion device operation condition 202 in accordance with the present invention. FIG. 2 illustrates an engine torque curve 204 plotted on a graph of engine torque 206 versus engine speed 208. The engine 102 operates in the area below the torque curve 204. The curve 107 is a portion of an exhaust temperature 107 contour line overlaid on the plot of engine torque 206 versus engine speed 208. One of skill in the art is familiar with and can construct exhaust temperature 107 contour lines for the areas of interest on an engine torque 204 versus engine speed 206 graph as shown in FIG. 2.

The combustion device operating condition 202 may comprise an exhaust output temperature 107 of the engine 102 at a selected engine torque 208 and engine speed 210. In one embodiment, the selected engine torque 210 and engine speed 212 are selected based upon expected engine 102 duty cycles for applications on which the system 100 will be installed. A duty cycle in this context is a quantitative description of the expected operating times for the engine 102 on the torque 206—speed 208 map. For example, one duty cycle of interest may comprise an engine 102 that is expected to spend 40% of the engine operating time near the selected engine torque 210 and selected engine speed 212. In the example embodiment, a selected combustion operating condition 202 comprising an exhaust output temperature 107 corresponding to the selected engine torque 210 and selected engine speed 212 ensures that the upstream downpipe segment 106 is constructed such that the selected minimum temperature 109 is achieved, and therefore catalytic component 108 initiates at least one conditioning reaction.

One of skill in the art will recognize that the exhaust output temperature 107 is dependent to some degree on the ambient temperature in some applications. In applications where the ambient temperature will not vary significantly, the exhaust output temperature 107 contour can be constructed for some nominal selected ambient temperature value 214, and the selected combustion device operating condition 202 may not comprise the ambient temperature. In applications where the ambient temperature will vary significantly, the selected combustion device operating condition 202 may comprise a selected ambient temperature value 214 which may be an ambient temperature value at which the system 100 is required to function normally. For example, if a design requirement is that the system 100 should remain emissions compliant down to −15 degrees C., then the selected combustion device operating condition 202 may comprise a selected ambient temperature value 214 of −15 degrees C.

The exhaust output temperature 107 may be explicitly constructed at the selected ambient temperature value 214—for example by taking exhaust temperature output 107 data points at various engine speeds 208 and engine torques 206 when the engine 102 is in an ambient environment equal to the selected ambient temperature value 214. However, the exhaust output temperature 107 may also be constructed by using an exhaust output temperature 107 curve at a standardized ambient temperature and correcting the exhaust temperature output 107 value. Generally, a corrected exhaust output temperature 107 can be determined from a standardized exhaust output temperature 107 from the following equation:

$$EXT_c = EXT_s + k \times (T_c - T_s)$$ Equation 1.

Where $EXT_s$ is the exhaust output temperature at the standardized exhaust output temperature 107, $T_s$ is the standardized ambient temperature, $T_c$ is the selected ambient temperature value, and $EXT_c$ is the corrected exhaust temperature output 107 value. K is a constant reflecting the dependence of the change in engine-out exhaust temperature based on the change in the ambient temperature. It is within the skill of one in the art to determine a k value for a particular system 100 by taking a few simple data points, but a k value of 0.8 has been observed to work well in many applications with a variety of combustion devices, and could be used in most applications.

For applications where extreme accuracy is required—for example where a very narrow range of temperatures is targeted within the catalytic component 108, or for applications where the standardized ambient temperature is much higher than the selected ambient temperature value, then an application-specific k value or actual exhaust output temperature 107 data at the selected ambient temperature value should be used. For example, if the standardized ambient temperature data is only available at 40 degrees C. ambient, and the system 100 is being installed in an application that will regularly operate in an arctic environment, a practitioner should check exhaust output temperature 107 data at a temperature closer to the planned environment temperature.

Figure 3:
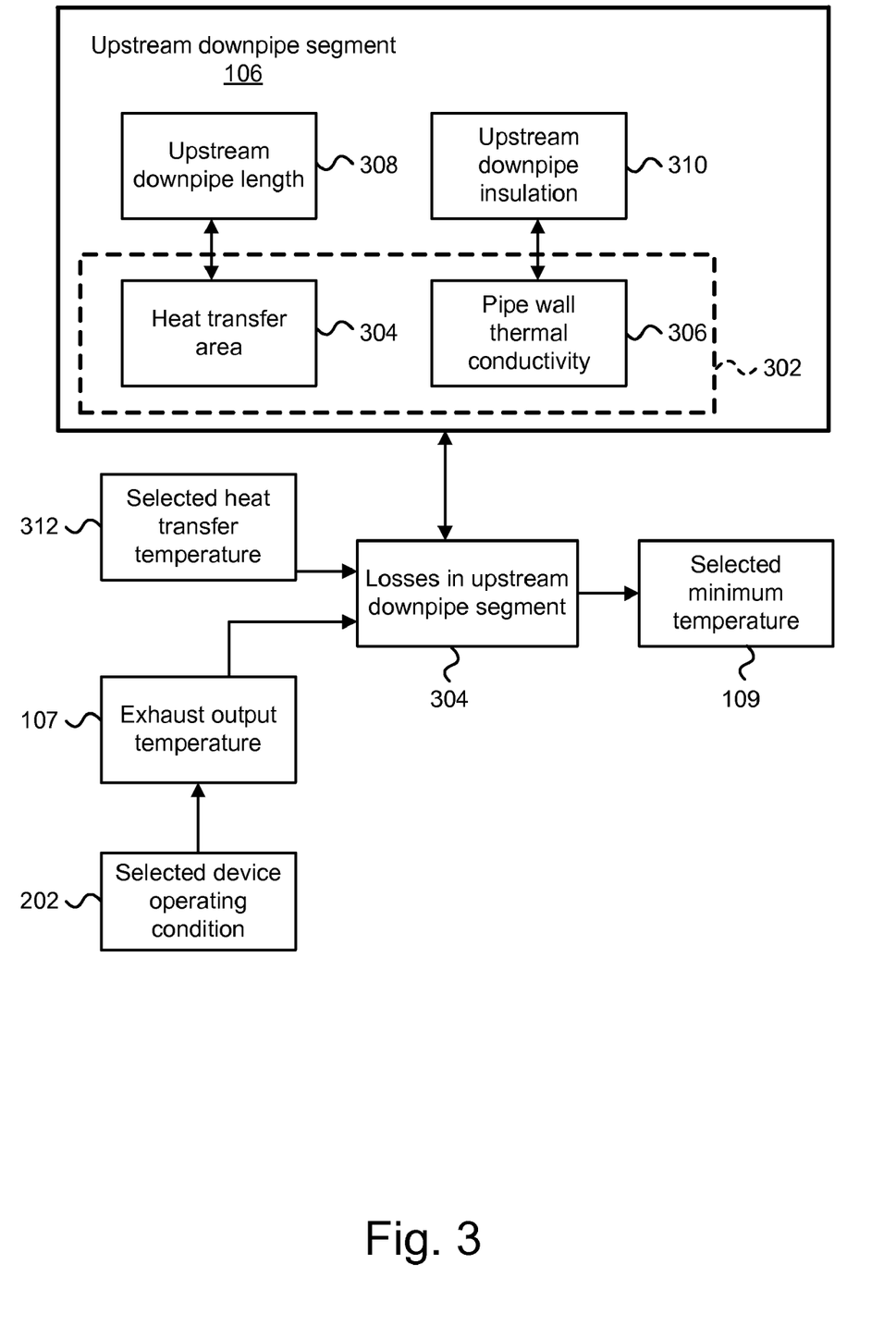
FIG. 3 is a schematic block diagram depicting one embodiment of an upstream downpipe segment comprising heat loss characteristics such that the heated exhaust products stream maintains at least a selected minimum temperature corresponding to a selected combustion device operating condition in accordance with the present invention.

FIG. 3 is a schematic block diagram depicting one embodiment of an upstream downpipe segment 106 comprising heat loss characteristics 302 such that the heated exhaust products stream maintains at least a selected minimum temperature 109 corresponding to a selected combustion device operating condition 202 in accordance with the present invention. The heat loss characteristics 302 illustrated in the embodiment of FIG. 3 comprise a heat transfer area 304 and a pipe wall thermal conductivity 306.

One of skill in the art will recognize that the primary heat transfer aspects of an upstream downpipe segment 106 comprise conduction, convection, and radiation of thermal energy. Therefore, changes in the heat transfer area 304 will affect all three aspects of heat transfer by reducing the available area for heat transfer. Changes in the pipe wall thermal conductivity 306 will reduce conduction directly, and will reduce convection and radiation by lowering the temperature of the outer wall of the upstream downpipe segment 106. It is recognized that changes in the reflectivity of components within the system 100 that surround the upstream downpipe segment 106, and changes in the system 100 that reduce the air flow around the upstream downpipe segment 106, can both be utilized to further alter the heat transfer characteristics 302 of the upstream downpipe segment 106. These changes are contemplated within the scope of the invention, but it is recognized that such changes may not be design criteria within the control of a practitioner of the invention, and/or may only be commercially valuable in certain challenging applications.

It is within the skill of one in the art to balance the economics and constraints of a particular application and determine when reflectivity changes—for example using a light colored paint on the engine 102, or air flow changes—for example installing a wind shield near the upstream downpipe segment 106, may be indicated.

In one embodiment, the design criteria to alter the heat transfer area 304 may comprise the downpipe length 308. In one embodiment, the design criteria to alter the pipe wall thermal conductivity 306 may comprise the upstream downpipe insulation 310. The selected device operating condition 202 may comprise an exhaust output temperature 107 corresponding to a selected minimum temperature 109. One of skill in the art can select an upstream downpipe segment 106 with heat loss characteristics 302 such that temperature losses 304 in the upstream downpipe segment 106 achieve the selected minimum temperature 109 at the downstream side of the upstream downpipe segment 106 when the exhaust output temperature 107 is input to the upstream side of the upstream downpipe segment 106.

The heat losses 304 may be calculated or tested at a selected heat transfer temperature 312 where the temperature surrounding the upstream downpipe segment 106 may be expected to significantly affect the heat losses 304 in the upstream downpipe segment 106. For example, in an indoor environment where the upstream downpipe segment 106 is surrounded by an engine 102 and other components of the system 100, the temperature surrounding the upstream downpipe segment 106 may not be expected to vary significantly and the heat losses 304 may be calculated or tested at some nominal surrounding temperature. Where the upstream downpipe segment 106 is installed in the expected wind stream of a moving vehicle, it may be expected that the ambient temperature will significantly affect the heat losses 304 in the upstream downpipe segment 106. An analytical or empirical determination of the heat losses 304 at the selected heating device operating condition 202 and/or selected heat transfer temperature 312 is a mechanical step for one of skill in the art.

The selected heat transfer temperature 312 may be the same as the selected ambient temperature 214 used in the selected device operating condition 202. However, since the determinations of the exhaust output temperature 107 and the losses in the upstream downpipe segment 304 have different errors associated, and respond differently to ambient temperature changes, the temperature values 214, 312 may not be the same value. For example, a selected ambient temperature value 214 of −15 degrees C. may be utilized to determine the exhaust output temperature 107, but a selected heat transfer temperature value 312 of 50 degrees C. may be utilized to determine losses in the upstream downpipe segment 304. The example is consistent with a system 100 wherein the intake air to an engine 102 is expected to be as low as −15 degrees C., but where the environment surrounding the upstream downpipe segment 106 is expected to be around 50 degrees C. during engine 102 operation.

One of skill in the art can design heat loss characteristics 302 for an upstream downpipe segment 106 based on the disclosures herein, but further guidance is provided for clarity. In one embodiment, the heat losses 304 to achieve a selected minimum temperature 109 corresponding to a selected heat transfer temperature 312 and exhaust output temperature 107 are determined. A preferred order for reducing the heat loss characteristics 302 until the required heat loss 304 criteria is met, in one embodiment, comprises reducing the upstream downpipe length 308 specification until the minimum allowable length is specified, then adding upstream downpipe insulation 310, then adding a wind shield (not shown) to block air circulation around the upstream downpipe segment 106, then painting (not shown) major components of the system 100 surrounding upstream downpipe segment 106 the to increase the reflectivity of surfaces in a line-of-sight with the upstream downpipe segment 106.

The preferred order for reducing heat loss characteristics 302 reflects only a generic cost model, and depends upon the specifics for a particular embodiment of the invention. It is within the skill of one in the art to determine a preferred order based on the cost components and system 100 design criteria for a particular embodiment of the invention. For example, physical constraints of the system 100 may specify the upstream downpipe length 308, and in the example the upstream downpipe length 308 is not a design criteria.

In many cases, an upstream downpipe length 308 of less than 12 inches creating a closely coupled catalytic component 108 to the engine 102, with standard stainless steel piping (i.e. no upstream downpipe insulation 310) will provide sufficient heat loss characteristics 302 to achieve the selected minimum temperature 109. In one embodiment, the upstream downpipe segment 106 comprises a mechanical coupling 106 of the catalytic component 108 to the turbocharger 104 outlet.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
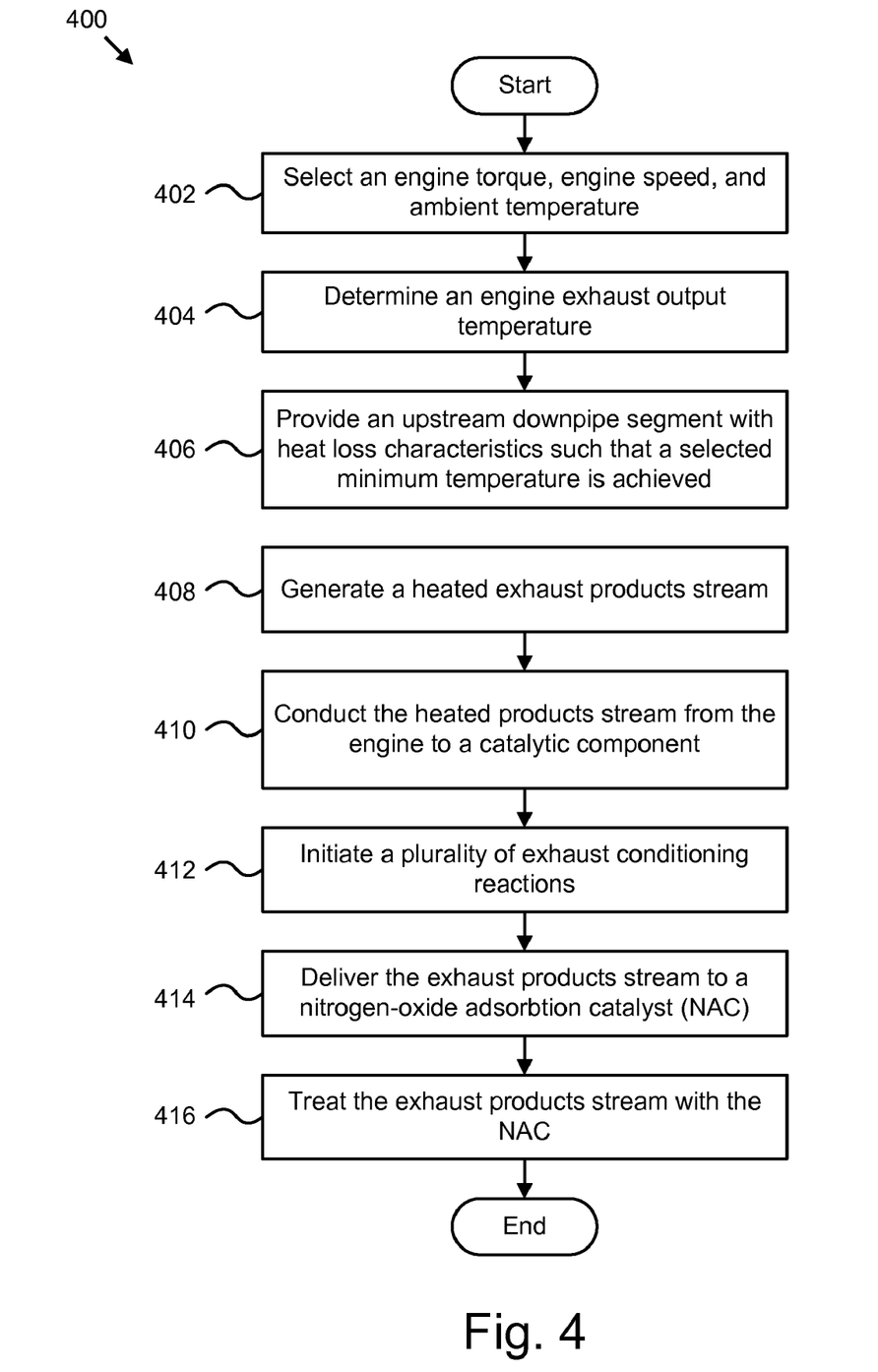
FIG. 4 is a schematic flow chart illustrating one embodiment of a method for treating exhaust gas in accordance with the present invention.

FIG. 4 is a schematic flow chart illustrating one embodiment of a method 400 for treating exhaust gas in accordance with the present invention. The method 400 may begin with a practitioner (not shown) selecting 402 an engine torque 206, engine speed 208, and ambient temperature 214 at which a corresponding selected minimum temperature 109 must be achieved. The practitioner may then determine 404 an engine exhaust output temperature 107 based on the selected 402 an engine torque 206, engine speed 208, and ambient temperature 214. The practitioner may provide 406 an upstream downpipe segment 106 with heat loss characteristics 302 such that the selected minimum temperature 109 is achieved based on the exhaust output temperature 107 and a selected heat transfer temperature value 314.

The method 400 may include an engine 102 generating 408 a heated exhaust products stream, and the upstream downpipe segment 106 conducting the heated exhaust products from the engine 102 to a catalytic component 108. The method 400 may proceed with the catalytic component 108 initiating 412 a plurality of exhaust conditioning reactions. The method 400 may further include a downstream downpipe segment 110 delivering 414 the exhaust products stream to a NAC 112. The method 400 may conclude with the NAC treating 416 the exhaust products stream to intermittently adsorb and reduce $NO_x$ in the exhaust products stream.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for utilizing engine-generated heat in a $NO_x$-adsorber system comprising a combustion device having disposed therein a heating chamber that generates a heated exhaust products stream, the apparatus comprising:

an upstream downpipe segment that receives the heated exhaust products stream, and delivers the exhaust products stream to a catalytic component, the upstream downpipe segment comprising heat loss reduction features configured to reduce the amount of heat transfer from the heated exhaust products stream in the upstream downpipe segment through a wall of the upstream downpipe segment, each heat loss reduction feature being defined by at least one property of the upstream downpipe segment, wherein the properties of the heat loss reduction features are preselected to achieve a temperature of the heated exhaust products stream exiting the upstream downpipe segment at or above a predetermined minimum temperature based on a predicted temperature of the heated exhaust products stream entering the upstream downpipe segment, a predicted temperature of the space immediately surrounding the upstream downpipe segment during normal operating conditions of the engine, and an estimated maximum allowable heat loss through a wall of the upstream downpipe segment, and wherein the heat loss reduction features comprise a reduced heat transfer area of the upstream downpipe segment and a reduced thermal conductivity of the wall of the upstream downpipe segment, wherein the at least one preselected property of the reduced heat transfer area comprises a predetermined length reduction of the upstream downpipe segment and the at least one preselected property of the reduced thermal conductivity of the wall comprises a predetermined increase in insulation surrounding the upstream downpipe segment;

the catalytic component comprising a catalyst on a substrate whereby the catalyst is configured to initiate at least one exhaust conditioning reaction within the heated exhaust products stream for temperatures of the heated exhaust products stream only at or above the predetermined minimum temperature;

a downstream downpipe segment in fluid communication with the catalytic component, such that the downstream downpipe receives the exhaust products stream from the catalytic component and delivers the exhaust products stream to a nitrogen-oxide adsorption catalyst (NAC); and the NAC comprising a $NO_x$ adsorbing and $NO_x$ reducing catalyst on a substrate.

2. The apparatus of claim 1, wherein the combustion device comprises an internal combustion engine, and wherein the predicted temperature of the heated exhaust products stream entering the upstream downpipe segment is based on a predicted engine torque and engine speed.

3. The apparatus of claim 2, wherein the predicted temperature of the heated exhaust products stream entering the upstream downpipe segment is based on a predicted ambient temperature value.

4. The apparatus of claim 3, wherein the at least one exhaust conditioning reaction comprises an NO to $NO_2$ conversion while the engine runs lean, and wherein the at least one exhaust conditioning reaction comprises a water gas shift reaction and a hydrocarbon partial oxidation reaction while the engine runs rich.

5. The apparatus of claim 2, further comprising a turbocharger, wherein the exhaust output temperature comprises the temperature at the turbocharger exhaust outlet.

6. The apparatus of claim 5, wherein the upstream downpipe segment comprises a mechanical coupling of the catalytic component to the turbocharger outlet.

7. The apparatus of claim 2, wherein the heat loss reduction features comprise at least one of an increased reflectivity of components proximate the upstream downpipe segment and air flow reduction devices for reducing air flow around the upstream downpipe segment.

8. The apparatus of claim 1, wherein the predetermined minimum temperature is based on a predicted heat transfer temperature value.

9. The apparatus of claim 1, wherein the at least one exhaust conditioning reaction comprises a hydrocarbon cracking reaction, and wherein the predetermined minimum temperature comprises 200 degrees C.

10. The apparatus of claim 9, wherein the catalyst of the catalytic component comprises platinum, rhodium, and palladium.

11. The apparatus of claim 1, wherein the at least one exhaust conditioning reaction comprises a water gas shift reaction, and wherein the predetermined minimum temperature comprises 200 degrees C.

12. The apparatus of claim 11, wherein the at least one exhaust conditioning reaction further comprises a hydrocarbon partial oxidation reaction.

13. The apparatus of claim 1, wherein the at least one exhaust conditioning reaction comprises an NO to $NO_2$ conversion, and wherein the predetermined minimum temperature comprises a temperature in a range between about 150 degrees C. and about 300 degrees C.

14. The apparatus of claim 1, wherein the at least one exhaust conditioning reaction comprises a hydrocarbon oxidation reaction, and wherein the predetermined minimum temperature comprises 200 degrees C.

15. The apparatus of claim 1, wherein the preselected length of the upstream downpipe segment is less than 12 inches.

16. The apparatus of claim 1, wherein the heat loss reduction features are added to the upstream downpipe segment and the associated properties of the heat loss reduction features are adjusted according to a preferred order until a temperature of the heated exhaust products stream exiting the upstream downpipe segment at or above the predetermined minimum temperature is achievable.

17. The apparatus of claim 1, wherein the at least one exhaust conditioning reaction comprises a lean $NO_x$ conversion, and wherein the predetermined minimum temperature comprises 200 degrees C.

18. The apparatus of claim 1, wherein the at least one exhaust conditioning reaction comprises a lean $NO_x$ conversion, and wherein the predetermined minimum temperature comprises 350 degrees C.

19. A method for treating exhaust gas generated by an internal combustion engine, the method comprising:

selecting an engine torque, engine speed, and ambient temperature;

determining an engine output exhaust temperature based on the selected engine torque, engine speed, and ambient temperature;

selecting a minimum exhaust temperature for exhaust conditioning reactions;

providing an upstream downpipe segment comprising heat loss reduction features configured to reduce the amount of heat loss from the exhaust gas generated by the internal combustion engine through a wall of the upstream downpipe segment, the heat loss reduction features being configured such that a temperature of exhaust gas exiting the upstream downpipe segment does not drop below the selected minimum exhaust temperature, wherein configuration of the heat loss reduction features is based on the engine output exhaust temperature, a predicted heat transfer temperature of space surrounding the upstream downpipe segment, and an estimated maximum allowable heat loss through a wall of the upstream downpipe segment, wherein the heat loss reduction features comprise a reduced heat transfer area of the upstream downpipe segment and a reduced thermal conductivity of the wall of the upstream downpipe segment, wherein configuring the heat loss reduction features comprises preselecting a length reduction of the upstream downpipe segment and preselecting an increase in the insulation surrounding the upstream downpipe segment;

conducting the heated exhaust products from the engine to a catalytic component through the upstream downpipe segment;

initiating a plurality of exhaust conditioning reactions on the heated exhaust products stream in the catalytic component at exhaust gas temperatures only at or above the predetermined minimum threshold, wherein the plurality of reactions comprises an NO to $NO_2$ conversion, and a partial oxidation of unburned hydrocarbons in the heated exhaust products stream;

delivering the exhaust products stream to a nitrogen-oxide adsorption catalyst (NAC); and treating the exhaust products stream with the NAC to intermittently adsorb and reduce $NO_x$ in the exhaust products stream.

20. The method of claim 19, the plurality of exhaust conditioning reactions further comprising a hydrocarbon cracking reaction.

21. The method of claim 19, the plurality of exhaust conditioning reactions further comprising a water gas shift reaction.

22. The method of claim 19, the plurality of exhaust conditioning reactions further comprising a lean $NO_x$ conversion.

23. The method of claim 19, wherein configuration of the heat loss reduction features comprises configuring the heat loss reduction features according to a preferred order until a temperature of exhaust gas exiting the upstream downpipe segment at or above the selected minimum exhaust temperature is achievable for the determined engine output exhaust temperature and predicted heat transfer temperature.

24. The method of claim 23, wherein the preferred order comprises first reducing a length of the upstream downpipe segment, second adding insulation about the upstream downpipe segment, third adding an air deflection device to reduce air circulation around the upstream downpipe segment, and fourth painting components surrounding the upstream downpipe segment to increase the reflectively of the components.

25. A system for treating exhaust gas generated by a diesel engine as a by product of operation, the system comprising:

a turbocharger in exhaust gas receiving communication with the engine on an upstream side of the turbocharger;

an upstream downpipe segment in exhaust gas receiving communication with the downstream side of the turbocharger, wherein the upstream downpipe segment receives the exhaust gas from the turbocharger and delivers the exhaust gas to a catalytic component, the upstream downpipe segment comprising heat loss reduction features configured to reduce the amount of heat loss from the exhaust gas through a wall of the upstream downpipe segment, the heat loss reduction features being configured such that a temperature of exhaust gas entering the upstream downpipe segment does not drop below a predetermined minimum temperature threshold as it flows through the upstream downpipe segment, wherein the configuration of the heat loss reduction features is based on a desired engine torque, a desired engine speed, a predicted ambient temperature, and a predicted heat transfer temperature of space surrounding the upstream downpipe segment, and configuration of the heat loss reduction features comprises preselecting a length reduction of the upstream downpipe segment and preselecting an increase in the insulation surrounding the upstream downpipe segment;

the catalytic component comprising a catalyst on a substrate whereby the catalyst initiates at least one exhaust conditioning reaction, wherein initiation of the at least one exhaust conditioning reaction occurs at exhaust gas temperatures only at or above the predetermined minimum temperature threshold;

a downstream downpipe segment in fluid communication with the catalytic component, such that the downstream downpipe receives the exhaust products stream from the catalytic component and delivers the exhaust products stream to a nitrogen-oxide adsorption catalyst (NAC); and the NAC comprising a NO adsorbing and NO reducing catalyst on a substrate.

26. The system of claim 25, wherein the at least one exhaust conditioning reaction comprises at least one member selected from the group comprising an NO to $NO_2$ conversion, a partial oxidation of unburned hydrocarbons in the heated exhaust products stream, a hydrocarbon cracking reaction, and a water gas shift reaction.

27. The system of claim 25, wherein configuration of the heat loss reduction features comprises configuring the heat loss reduction features according to a preferred order until a temperature of exhaust gas exiting the upstream downpipe segment at or above the selected minimum exhaust temperature is achievable for the desired engine torque, desired engine speed, predicted ambient temperature, and predicted heat transfer temperature of space surrounding the upstream downpipe segment, and wherein the preferred order comprises first reducing a length of the upstream downpipe segment, second adding insulation about the upstream downpipe segment, third adding an air deflection device to reduce air circulation around the upstream downpipe segment, and fourth painting components surrounding the upstream downpipe segment to increase the reflectively of the components.

28. The system of claim 25, wherein the predetermined minimum temperature threshold corresponding to a selected minimum diesel engine workload comprises a temperature in a range between about 150 degrees C. and about 300 degrees C.

* * * * *